United States Patent [19]
Tayloe

[11] Patent Number: 5,933,785
[45] Date of Patent: Aug. 3, 1999

[54] TELEPHONE AND METHOD FOR CONCURRENT REGISTRATION OF TWO IDENTIFICATION NUMBERS USING MULTI-NUMBER SIM CARD

[75] Inventor: Daniel Richard Tayloe, Phoenix, Ariz.

[73] Assignee: Motorola, Inc., Schaumburg, Ill.

[21] Appl. No.: 08/859,194

[22] Filed: May 20, 1997

[51] Int. Cl.[6] .................................................. H04Q 7/20
[52] U.S. Cl. ........................... 455/558; 455/557; 455/435
[58] Field of Search .................................... 455/558, 557, 455/435, 434, 551, 552, 432

[56] References Cited

U.S. PATENT DOCUMENTS

| | | | |
|---|---|---|---|
| 5,303,291 | 4/1994 | Takagi et al. ........................... | 455/557 |
| 5,444,764 | 8/1995 | Galecki .................................. | 455/558 |
| 5,497,411 | 3/1996 | Pellerin ................................... | 379/59 |
| 5,615,260 | 3/1997 | Kurgan ................................... | 376/434 |
| 5,657,373 | 8/1997 | Hermansson et al. .................. | 455/435 |
| 5,675,628 | 10/1997 | Hokkanen ............................. | 455/433 |
| 5,742,910 | 4/1998 | Gallant et al. ......................... | 455/558 |
| 5,887,266 | 2/1999 | Heinonen et al. ..................... | 455/558 |

*Primary Examiner*—Edward F. Urban
*Assistant Examiner*—Tilahon Gesesse
*Attorney, Agent, or Firm*—Gregory J. Gorrie

[57] ABSTRACT

A telephone includes a SIM card reader which receives SIM cards. The SIM card may contain two or more telephone numbers for which the phone is activated. One of the numbers may be a temporary number which is linked in use to, for example, a time period. By providing the capability of having two or more numbers on a SIM card, a single phone may respond to incoming calls for a different number of telephone numbers.

26 Claims, 3 Drawing Sheets ns. 5,933,785

TELEPHONE AND METHOD FOR CONCURRENT REGISTRATION OF TWO IDENTIFICATION NUMBERS USING MULTI-NUMBER SIM CARD

FIELD OF THE INVENTION

The present invention pertains to communication systems, in general, and to personal communication systems of a type utilizing a Subscriber Identification Module (SIM), in particular.

BACKGROUND OF THE INVENTION

In radiotelephone systems such as the Global System for Mobile Communications (GSM) radiotelephone system in use in Europe, a SIM card is inserted into a radiotelephone for providing subscriber identification, billing information and other information concerning the operation of the radiotelephone. The SIM is a key component of the GSM and typically comprises a smart card which is inserted into a GSM phone in order to make the phone work.

In a typical cellular telephone communication system, each subscriber unit is assigned a mobile subscriber (MSI) which uniquely identifies the subscriber unit from other subscriber units. In the European cellular communication system, one such identifier is the international mobile subscriber identification number (IMSI).

It is highly desirable to provide a personal communication system which has a single personal telecommunications device which is operable in all available cellular systems, e.g., AMPS, TDMA, CDMA, GSM, etc. across all available cellular frequencies, e.g., 900 MHz or 1800 MHz as well as satellite frequencies, and which operates like an inexpensive cordless phone when the user is at home.

In conjunction with such an approach the user has a single phone number, and that phone number tracks that phone such that wherever the phone is, that is where the user is. In those approaches each universal identification number or telephone number may have multiple network numbers associated with it to permit the single telephone number to be used in different networks.

In the SIM environment, a user is not constrained to carry his own personal communications device on him at all times, since it is SIM plus a generic, non-user specific communications device which the system sees, as opposed to a specialized, user specific device such as a conventional wireline phone or a conventional non-GSM cellular phone. In a network where you have one user-one number, this is desirable.

It may be desirable for a person to have two universal numbers, one for personal communications, and one for work. It seems unlikely that it would be desirable to have a single number used for both work and a personal life, as these two different types of calls usually require different telephone mannerisms when first answering such calls. In such dual number cases, the personal number may be in force almost all the time, while the work number is used primarily at the office but occasionally at home or while in the car. In such case, it would be desirable for the user to be able to receive calls in secure communications mode for both numbers.

In another situation easiest understood by way of an example, a computer network person assigned to a help line may be on call for overnight or weekend emergency service. If the computer help line numbers is on a SIM, a computer network specialist could take that SIM home and place it in his home telephone coupled to the conventional wire line phone and receive help line calls there or in his car phone while driving around town, both using a secure mode of communications. However, at the same time he would like to be able to receive personal calls from his personal number.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

U.S. Pat. Nos. 5,615,260; 5,257,414 and 5,444,764 all issued to Motorola, Inc., the assignee of the present invention, are incorporated herein by reference.

Figure 1:
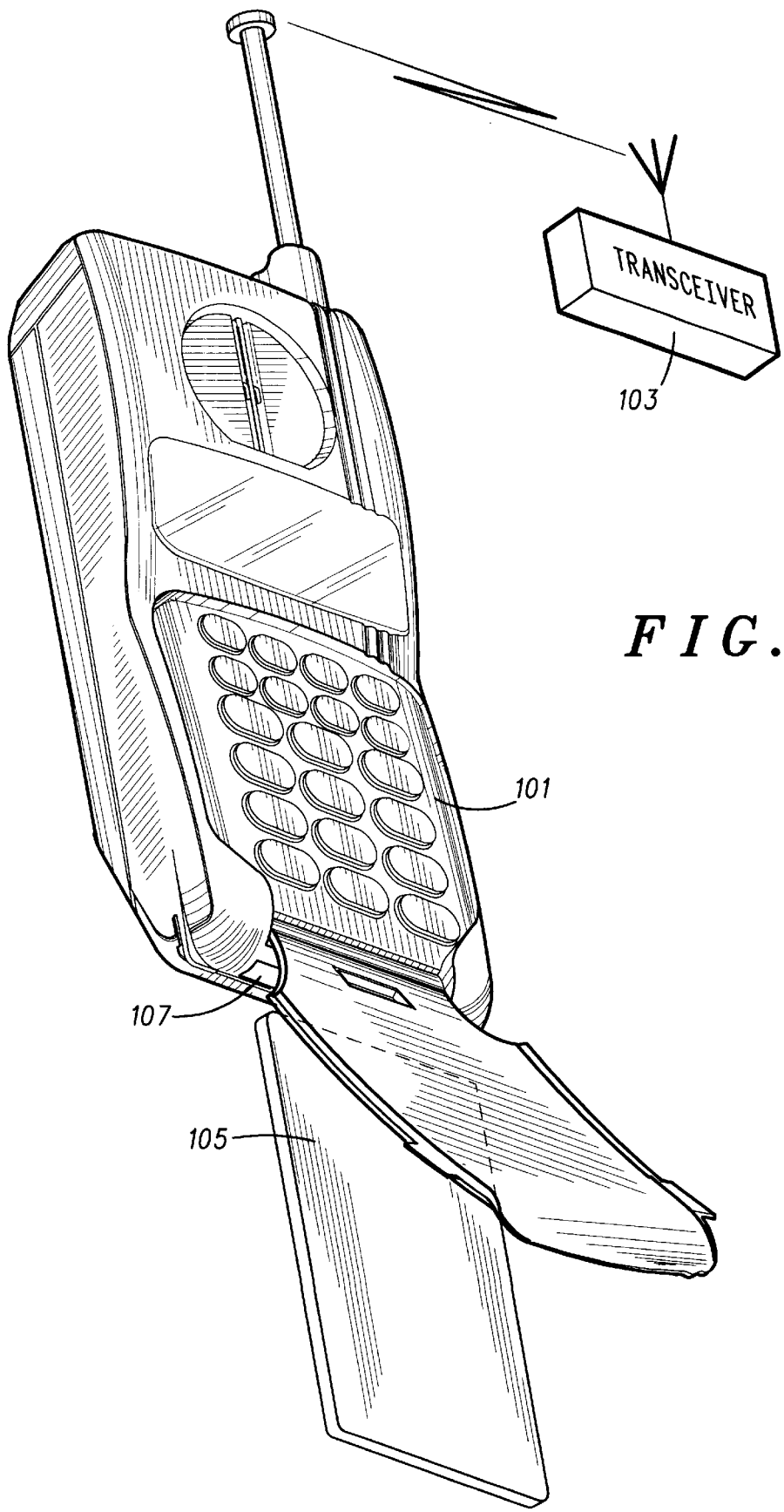
FIG. 1 is a radiotelephone system in accordance with a preferred embodiment the present invention.

FIG. 1 is a block diagram of a radiotelephone communications system in accordance with the present invention. The fixed site transceiver 103 transmits and receives radio frequency (RF) signals to and from mobile and portable radiotelephones located within a fixed geographic service area. Radiotelephone 101 is one of the portable radiotelephones served by the fixed site transceiver 103. The RF signals transmitted between the fixed site transceiver 103 and the portable radiotelephone 101 include data or voice signals, subscriber identification, and billing information. The billing information sent from the portable radiotelephone 101 to the fixed site transceiver 103 is stored in a memory contained on SIM cards 105. Each SIM card 105 can be a full size or a chip size smart card. The billing information contained within the SIM card 105 is read by a card reader contained within the radiotelephone 101. The card reader may be of the type described in the aforementioned U.S. Pat. No. 5,615,260.

Figure 2:
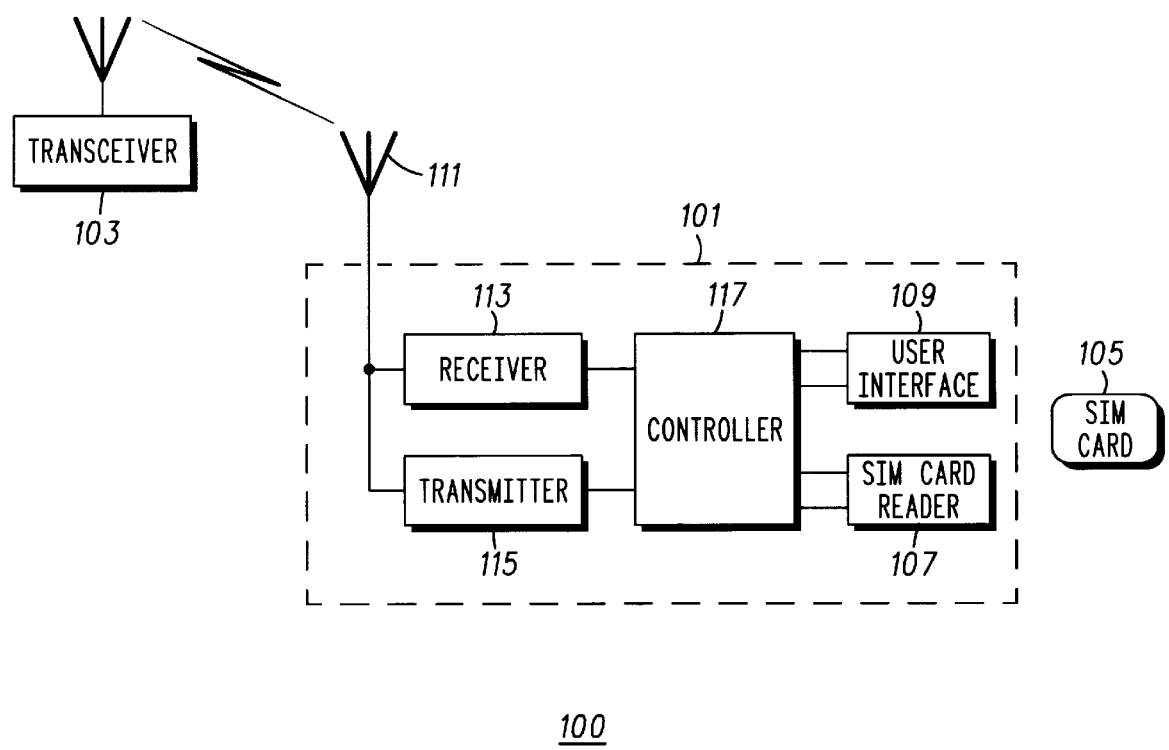
FIG. 2 is an illustration in block diagram form of the radiotelephone system of FIG. 1 in accordance with a preferred embodiment of the present invention.

FIG. 2 is an illustration in block diagram form of the radio telephone system of FIG. 1. In the radio telephone system, a portable transceiver 101 sends and receives radio frequency (RF) signals to and from mobile and portable radio telephones within a fixed geographic area served by the fixed site transceiver 103. Radio telephone 101 is one such radio telephone served by the transceiver 103.

Upon power-up of the radiotelephone 101, a SIM card 105 is inserted by the user into the SIM card reader 107 contained within the radiotelephone 101. Upon insertion of the SIM card 105, the radiotelephone 101, prompts the user through the user interface 109 to insert a personal identification number (PIN) to unlock the SIM card allowing access to the subscriber information contained therein. In other embodiments, the SIM card may not require the entry of a PIN number to unlock the subscriber information contained therein. Upon entering the SIM card access PIN, the radiotelephone 103 executes the process 300 illustrated in FIG. 3 and subsequently described in detail. After successfully completing the process 200, a radiotelephone 101 is fully registered for service in the radiotelephone system 100 of FIG. 1. The radiotelephone 101 is now able to send and receive RF signals from the remote transceiver 101.

While receiving RF signals from the transceiver 103, the radio telephone 101 uses the antenna 111 to couple the RF signals and to convert the RF signals into electrical RF signals. The electrical RF signals are received by the radio receiver 113 for use within the radio telephone 101. The receiver 113 demodulates the received electrical RF signals and outputs an information signal for use by the controller 117. The controller 117 formats the information signal into voice or data for use by the user interface 109. The controller 117 includes a microprocessor, such as a MC68332 available from Motorola, Inc., and memory devices such as RAM and EEPROM. The user interface 109 is used to convey information between a user and the radio telephone 101, typically including a microphone, a speaker, a display, a data port and a keypad.

Upon the transmission of the RF signals from the portable radio telephone 101 to the transceiver 103, the voice and/or data signals from the user interface 109 are processed by the controller 117. The processed signals are input into the transmitter 115. The transmitter 115 converts the data into electrical RF signals. The electrical RF signals are converted into RF signals and output by the antenna 111. The RF signals are received by the transceiver 103 and converted for use with a land line telephone system.

Prior systems allow one number, e.g., a work number, to be forwarded to a home phone. However, the home phone number is usually shared between all family members, which makes it difficult to automatically redirect calls for just one member of the family to another phone, such as to a cellular phone or a work phone.

In accordance with the principles of the invention a communications device 101 is provided with the capability to accept a SIM card 105 having multiple universal numbers, each with its own user specific encryption algorithms. The communication device 101 is therefore able to provide service for more than one user and in particular, to be able to accept incoming calls. For each different universal identification number, the device 101 can keep track of the encryption necessary for each number and, if necessary, register that number on the system currently providing service.

For a conventional wire line communications unit (a corded or cordless phone), the unit contacts the network service provider such that all incoming calls will be routed to this communications unit, encrypted as specified by the SIM card 105.

A communications device with multiple universal identification number capability allows a person to accept calls at a single communication device for either his personal number, his work number or for both at the same time. Alternatively, several different people each with different numbers (on one SIM card) can receive secure calls on a common communications device on a dynamic basis.

The invention provides a method of dealing with multiple secure numbers per user (work/business/personal) as well as multiple users per secure communications unit (such as a family with several different personal numbers).

Where a single user has two or more universal numbers assigned to him/her, such as one for personal communications, and one or more for other purposes such as work, the personal number may be used almost all the time, but the work number may be used primarily at the office but occasionally at home or while mobile. In accordance with the invention, a single SIM contains information pertaining to more than one universal number, including multiple sets of encryption data, one or more sets per number. The communications device 101 that the SIM card 105 is inserted allows selective enabling and/or disabling of the individual numbers contained on the card and selectively choosing the encryption data set to be used with that number. The communications device 101 indicates which number an incoming call is for, so that the user can answer the call appropriately. For outgoing calls, the capability is provided to select which of the numbers on the SIM to access the system as (i.e.: which number to charge against) when placing the call.

The user may receive a secure communications destined for one or more numbers. For example, the user could keep his personal number enabled at all times, so that he can receive calls to that number at all times. His second number, if associated with work, may be selectively turned on or off so as to only receive secure work calls at certain times. The on/off period of a given number may be preprogrammed so that secure communications over that number can be enabled only during certain predetermined hours, perhaps depending also on the day of the week. In this way, a person who is only supposed to handle emergency calls during evenings or weekends could automatically enable that number during those times.

Figure 3:
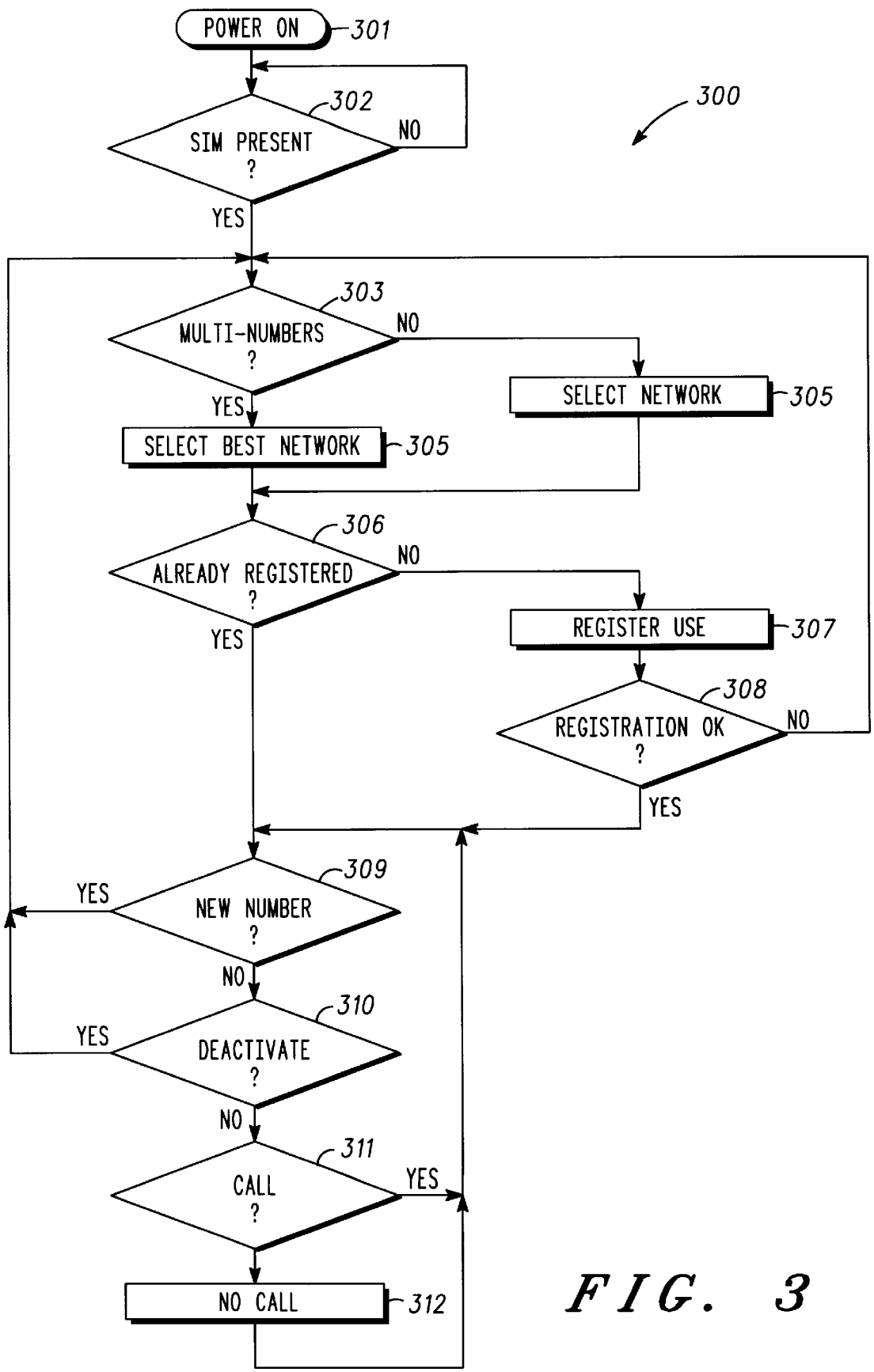
FIG. 3 is a flow chart of the operation of the radiotelephone of FIGS. 1 and 2 in accordance with a preferred embodiment of the present invention.

Turning now to FIG. 3, operation of the telephone device 101 with a SIM card 105 having multiple universal numbers is described. The operations are performed by the controller 117 through programmed operation.

For purposes of clarity it is emphasized that the term "multiple universal numbers" means separate identification numbers representing different functional identities or telephone numbers rather than the same identity or telephone number on different system networks.

After the phone is turned on in step 301, the phone 101 checks in step 302 to see if there is a SIM card 105 present. If there is no SIM card 105 present, the phone 101 will wait for one to be inserted before continuing.

When it is determined that an SIM card 105 is present, step 303 checks to see if the SIM card 105 has data for more than one providing network (wireless or even wireline). If there are no available networks the phone will indicate that there is no service available.

If there is data for more than one network, the best network is selected in step 304. Step 304 involves searching to determine which networks are currently available, and selecting among these based upon factors such as personal preference, cost, reliability, and perhaps throughput (in the case of data transactions).

There may be multiple universal numbers on this card and each universal number may have associated with it several allowed networks (wireless or otherwise). The phone only monitors incoming calls on a single system, and the "best" system will need to take into account the needs of all the universal numbers and their associated allowable networks, and try to pick a "best" system that represents common ground for all the allowable universal numbers on the SIM card 105.

Certain phones may monitor for rings on more than one network, limited to perhaps two at a time or only certain combinations. For example, a dual receiver phone may be able to listen to two separate systems at the same time. For such phones able to listen for incoming calls on more than one system, the universal numbers may be registered on different systems.

If there is data for only one network indicated on the SIM card 105, that network service is selected in step 304.

After a service is selected, step 306 checks to determine for each universal number, if that number is already registered on the selected network. If a universal number is not already registered on the selected network, the phone 101 attempts to register the user on the selected network in step 307.

In step 308 a determination is made whether the registration attempt is successful. If the attempted registration attempt is not successful, the unit will go back to step 303 and attempt to select another network, removing from consideration the network that just failed for that particular universal number.

The failure of one number to get registered will cause the phone to select another "best" system for the other universal number as well.

Once all the SIM cards' universal numbers have been registered that can be registered, the phone 101 waits for one of the following to happen: receipt of an incoming phone call (step 311), activation of an additional universal number (step 309) or deactivation of a universal number (step 310). If no call is received, the phone 101 cycles back to step 309. If a call is detected, the phone call is processed in conventional fashion (step 312). When the call is complete the phone 101 cycles back to step 309.

When an incoming call is received at step 311, the phone 101 alerts the user of an incoming call and indicates which number it is for. The phone may differentiate between the universal numbers by different audio tones for tone sequences, or visually such as via a display indicating the universal number the call is for. The differentiation is done by the controller 117. When an incoming call is received, the phone 101 will check for the security preference for that network and that number and will or will not activate secure communications based upon those preferences. Security normally means voice and data encryption/decryption.

These preferences may also be manually over ridden by the user. Alternatively, the incoming call may indicate a desired security preference which the controller 117 will respond to, given the security information on the SIM card 105.

When an out going call is made, the user must select which universal number against which to place the call. Preferences for security from the SIM card can either be automatically applied or manually invoked. In either case, the controller 117 operates to provide the security. "Security" means encrypting/decrypting the incoming and out going voice and/or data.

If an additional universal number is activated, the universal number activated may be either a permanent or a temporary number. The additional number may be activated by keying in an additional PIN number on the keypad of the phone 101. A permanent number is one that is not user alterable on the SIM card. A user may selectively enable or disable numbers that the phone is looking for incoming calls for. For example, a user may have a universal number corresponding to his normal work identity, such as an engineer, and another corresponding to his private life. After hours, he may not want to be disturbed by calls from work, so that universal number can be deactivated, either manually or automatically via a stored schedule.

The deactivation process can reside in either the SIM card 105 or in the phone controller 117. In either case, the SIM card 105 may optionally contain a program schedule for activation/deactivation for each number. If the phone 101 is taking care of this, the controller 117 can read the schedule information on the SIM card 105 and, knowing the current time, can itself determine when to activate or deactivate the number. Alternatively, the SIM card 105 can keep track of time itself, and activate/deactivate the number at the appropriate time by notifying the phone.

A temporary number is a universal number that can be added or deleted by the user from the SIM card 105. An example of this might be a computer "help desk" function. Several staff members may take turns being responsible for answering questions to this number over the weekend. When it is one particular persons turn, his SIM card 105 can be loaded with a "temporary" number associated with the "help desk" number, valid for his weekend duty. This temporary number may have an expiration time associated with it for automatic deletion or may be manually deleted or deactivated. The temporary number may either be entered manually via a user interface, or copied from an original SIM card 105 via a phone unit.

In either case, the activation of a new universal number in step 309 results in step 303 being revisited in order to reevaluate the "best" network, given the new universal number and the networks valid for it.

When a number is deactivated step 310 deregisters the user with the network it was connected to. This would normally occur when the SIM is withdrawn from the phone, but may happen according to a scheduled event (turn off a number at a scheduled time) or alternatively may be manually invoked (user no longer wants to receive calls on that number).

When a number is deactivated (manually or automatically, either a permanent or temporary number), step 303 is revisited in order to determine if the "best" network now needs to change for remaining activated numbers.

In the above described embodiment, it is assumed that a SIM card 105 needs to be present in the phone 101 the entire time the phone 101 is watching for incoming calls. If the SIM card 105 is removed, the numbers on the SIM card 105 are deactivated in the phone 101 and may be detached (un-registered) with the network it is registered with.

In an alternative embodiment, the SIM card 105 could be placed in the phone long enough for the phone just to read the information on the SIM. From there, the phone would act as if the SIM card 105 is in the phone.

The data may be copied from a SIM card 105 into the phone 101. Phone 101 could register and use the numbers on the SIM until the SIM is used elsewhere in the network. At that point in time, as the numbers are registered with the new device, they would detach (un-registered) with the last used phone. This embodiment changes the above flow chart of FIG. 3 in that there is no deactivation upon the removal of the SIM as shown in step 310.

The various steps described in conjunction with FIG. 3 are performed by the controller 117 as programmed functions.

As will be understood by those skilled in the art, various changes may be made to the embodiments described above without departing from the spirit and scope of this invention.

What is claimed is:

1. A method of controlling access of a telephone in a telephone system comprising the steps of:

accepting a subscriber identification module (SIM) card in said telephone, said SIM card containing a first universal identification number and a second universal identification number;

registering said telephone in said telephone system using said first universal identification number; and registering said telephone in said telephone system using said second universal identification number, said second universal identification number being registered concurrently with said first universal identification number, whereby calls associated with either said first or second universal identification numbers may be accepted by said telephone.

2. A method in accordance with claim 1 wherein said second number is a temporary number.

3. A method in accordance with claim 1 wherein said telephone is a radiotelephone.

4. A method in accordance with claim 3 wherein said radiotelephone is a cellular telephone.

5. A method in accordance with claim 1 further comprising the steps of:

determining from said SIM card if it contains first data for said first universal identification number for more than one providing telephone system;

determining from said SIM card if it contains second data for said second universal identification number for more than one providing telephone system; and selecting a providing telephone system for registering said first and second universal identification numbers based upon said first and second data.

6. A method in accordance with claim 1 further comprising the step of determining from said SIM card if it contains first data for more than one providing telephone system for said first universal identification number and selecting a first network for registration of said first universal identification number.

7. A method in accordance with claim 6 further comprising the steps of:

determining from said SIM card if it contains second data for more than one providing telephone system for said second universal identification number and selecting a second providing telephone system for registration of said second universal identification number.

8. A method in accordance with claim 6 further comprising the step of attempting to register said first universal identification number with said first providing telephone system.

9. A method in accordance with claim 8 comprising the steps of:

determining whether said registration attempt is unsuccessful; and attempting to register said first universal number with an alternate providing telephone system if said attempt is unsuccessful.

10. A method in accordance with claim 8 further comprising the steps of attempting to register said second universal identification number with said second providing telephone system.

11. A method in accordance with claim 10 further comprising the steps of:

determining whether said registration of said second universal identification number is unsuccessful; and attempting to register said second universal identification number with another providing telephone system if said attempt is unsuccessful.

12. A method in accordance with claim 1 further comprising the steps of:

providing a first alert indication to indicate incoming calls are for said first universal identification number; and providing a second alert indication to indicate incoming calls are for said second universal identification number.

13. A method in accordance with claim 1 further comprising the step of selecting one of said first or second universal identification numbers for an outgoing call.

14. A method in accordance with claim 1 further comprising the step of deregistering said first universal identification number upon removal of said SIM card from said telephone.

15. A method in accordance with claim 1 further comprising the step of deregistering said first universal identification number upon the occurrence of a predetermined activity.

16. A telephone comprising:

means for accepting a subscriber identification module (SIM) card, said SIM card containing a first universal identification number and a second universal identification number;

means for registering said telephone in a providing telephone system using said first universal identification number; and means for registering said telephone in said providing telephone system using said second identification number concurrently with the registration of said first universal identification number, whereby calls associated with either said first or second universal identification numbers may be accepted by said telephone.

17. A telephone in accordance with claim 16 further wherein said telephone comprises a cellular telephone.

18. A telephone in accordance with claim 16 further comprising:

means for determining from said first SIM card if said SIM card contains first data for said first universal identification number for more than one providing telephone system and for determining if said SIM card contains second data for said second universal identification number for more than one providing telephone system; and means for selecting one of said providing telephone network for registering said first universal number based upon said first data.

19. A telephone in accordance with claim 18 further comprising means for selecting one of said providing telephone systems for registering said second universal number based upon said second data.

20. A telephone in accordance with claim 18 further comprising means for attempting to register said first universal identification number with a first providing telephone system corresponding to said first data.

21. A telephone in accordance with claim 20 further comprising means for selecting a providing telephone system for registering said second universal identification number corresponding to said second data.

22. A telephone in accordance with claim 16 further comprising means for providing a first alert indication to indicate incoming calls are for said first universal identification number and for providing a second alert indication to indicate incoming calls are for said second identification number.

23. A telephone in accordance with claim 16 further comprising means for deregistering said first universal identification number upon the occurrence of a predetermined activity.

24. A telephone comprising:

SIM card receiving apparatus;

circuitry reading first and second universal identification numbers from a SIM card received in said receiving apparatus;

telephone network accessing circuitry; and a processor receiving said first and second identification numbers from said SIM card and for operating said accessing circuitry to register said first and second universal identification numbers concurrently with a providing telephone network, whereby calls associated with either said first or second universal identification numbers may be accepted by said telephone.

25. A telephone in accordance with claim 24 wherein said reading circuitry reading first data is associated with said first universal identification number and second data associated with said second universal identification number; and said processor is operable to use said first and second data to attempt to register said telephone with provide telephone systems through said accessing circuitry.

26. A subscriber unit comprising a subscriber identification module (SIM) card reader for reading a SIM card containing a first universal identification number and a second universal identification number; and a controller for concurrently registering said subscriber unit with a communication system using said first and second universal identification numbers, whereby calls associated with either said first or second universal identification numbers may be accepted by said subscriber unit.

* * * * *